United States Patent Office 3,364,725
Patented Jan. 23, 1968

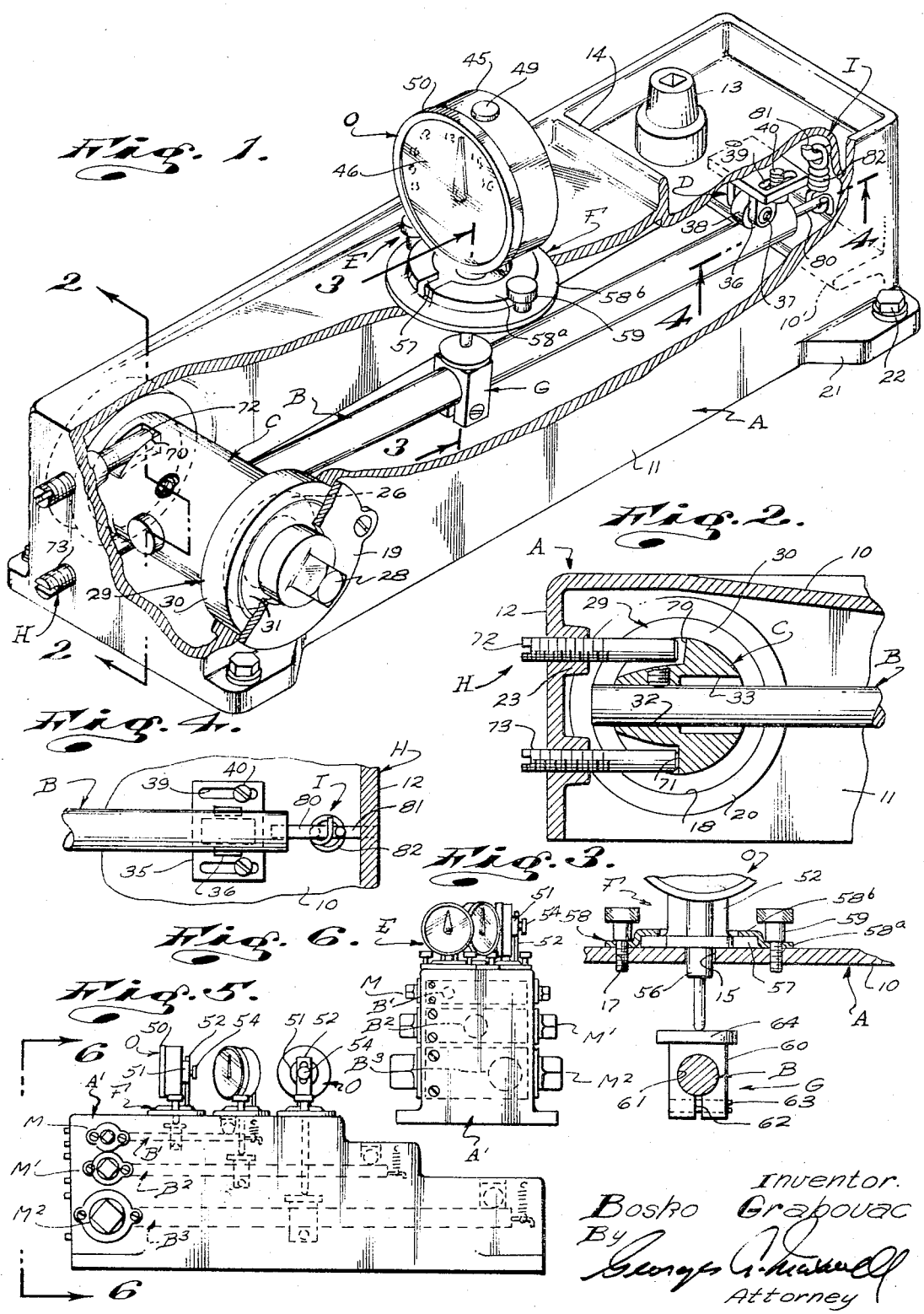

3,364,725
TORQUE WRENCH TESTER
Bosko Grabovac, 3106 Ridgeview Drive,
Altadena, Calif. 91001
Filed Apr. 26, 1965, Ser. No. 450,667
14 Claims. (Cl. 73—1)

ABSTRACT OF THE DISCLOSURE

An apparatus for testing torque wrenches and other tools for applying a controlled torque to screw fasteners. A shaft to which the torque applying tool can be engaged is journaled at one end of an elongated casing. A deflection beam is fixed to the shaft perpendicular to its axis and is restrained at its distal end by an adjustable anti-friction bearing so that torque applied to the shaft bends the deflection beam. Means are provided for measuring the deflection of the beam as a function of the torque applied to the shaft.

---

Breakaway type wrenches and other similar torque controlled hand tools and devices, for advancing screw fasteners and the like, are widely used throughout the industry.

In recent years, the requirement that forces exerted onto and through structures by means of threaded fasteners and the like, be limited or controlled, has increased at a great rate. At the same time, the allowable tolerances or accuracies and control that is demanded in applying torque onto and through parts, is becoming more acute.

Since the torque limits that can be and are specified are infinite in degree, it is not practical to provide a wrench or other suitable torque imparting hand tool or device for each possible size and/or type of fastener and for every possible torque magnitude. Accordingly, the ordinary breakaway type wrench or controlled torque hand tool is provided with means for adjusting and varying the torque limits of the tool so it can be advantageously set to any desired torque, within the inherent limits of the tool. Ordinarily, such tools are provided with calibrated means intended to indicate the torque for which the tool is set, but, unfortunately, due to many factors, such as metal fatigue, temperature changes and the like, such calibrated means are, at best, only effective to give a cursory indication of the area in the torque range of the tool, at which it is set.

Accordingly, there is an ever-increasing need and call for a tester for accurately determining and calibrating the torque limits or settings of tools of the general character referred to, whereby such tools can be advantageously set or adjusted as circumstances require.

The prior art has provided many and varying types of torque testers, but to the best of applicant's knowledge, each has been a complicated, costly and cumbersome device, repleat with disadvantages and shortcomings.

An object of my invention is to provide a simple, neat and compact, highly effective and dependable torque tester which is easy and economical to manufacture, operate and maintain.

It is an object and feature of my invention to provide a torque tester for the purpose indicated which includes a single, elongate, deflection beam rotatably supported at one end in a drive shaft on an axis transverse to the longitudinal axis of the beam and supported at the other end on an antifriction support, and a dial indicator or gauge arranged intermediate the pivotal axis of the beam and the rear end support, to measure the deflection of the beam in terms of units of torque, resulting from the application of torque to the pivotal axis support end of the beam.

The construction can be arranged to either deflect the beam upward or downward, pushing the gauge stem upward or pulling the stem downward to measure the deflection, by locating the rear end beam support above or below the rear end of the beam, as may be desired for different torque range sizes of testers.

It is an object of my invention to provide a torque tester of the general character referred to wherein the torsional forces to be measured are applied directly to the pivotal axis of the deflection beam.

A further object is to provide a structure of the character referred to having novel pivotal support means for the beam and with which the tool or device to be tested can be easily and conveniently engaged.

Yet another object of my invention is to provide novel stop means to limit the pivotal movement and resulting deflection of the beam, which means is related to the pivotal support means and is remote from the beam per se.

It is an object of the present invention to provide a torque tester of the character referred to which is easy and convenient to adjust and set.

Still another object of my invention is to provide support means for said other end of the beam which is shiftable relative to the longitudinal axis of the beam, whereby the effective length of beam can be rapidly and conveniently adjusted to control the amount of beam deflection for calibrating the construction.

Yet another object of the present invention is to provide a structure of the character referred to wherein the gauge is arranged in a fixed position relative to the beam and wherein a novel contact means is provided on the beam for engaging and operating the gauge.

It is an object of this invention to provide a gauge contact means on the beam which is shiftable longitudinal thereof to provide a second means for adjusting and calibrating the construction.

Yet another object of the present invention is to provide a structure of the character referred to wherein the pivotal support means includes a transversely extending drive shaft supported by antifriction bearings, which shaft is provided with tool engaging means at the opposite ends thereof, whereby the construction can be advantageously employed to test both clockwise and counter-clockwise torsional forces with the deflection of the beam always occurring in the same direction.

It is still another object of my invention to provide a structure of the character referred to wherein the gauge is provided with novel, releasable mounting means whereby the gauge can be advantageously removed for storage and/or service and whereby the gauge can be advantageously rotated for convenient reading of the dial face thereof, as circumstances require.

Finally, it is an object of this invention to provide torque testing mechanism of the character referred to which is of minimum vertical and lateral extent, is devoid of secondary arms, links and levers and the like, and is such that it can be easily, conveniently and advantageously closely and compactly related with one or more similar mechanisms of different or varying size, in a single, small, neat and compact housing, or the like.

The various objects and features of my invention will be fully understood from the following detailed description of typical preferred forms and applications of my invention, throughout which description reference is made to the accompanying drawings, in which:

FIG. 1 is an isometric view of my new torque tester with portions broken away to better illustrate the details of the construction;

FIG. 2 is a sectional view taken substantially as indicated by line 2—2 on FIG. 1;

FIG. 3 is a sectional view taken substantially as indicated by line 3—3 on FIG. 1;

FIG. 4 is a view taken substantially as indicated by line 4—4 on FIG. 1;

FIG. 5 is a side, elevational view of another form of the invention; and,

FIG. 6 is an end view of the structure shown in FIG. 5 and taken as indicated by line 6—6 on FIG. 5.

The structure that I provide includes, generally, an elongate, horizontally disposed frame or housing A having front and rear ends, an elongate deflection beam B arranged within and extending longitudinally of the housing, pivotal mounting means C at the front end of the housing and engaging and supporting the adjacent or front end of the beam, support means D carried by the housing in fixed position above or below the outer or rear end of the beam B and engageable therewith, a gauge assembly E for measuring the deflection of the beam, mounting means F releasably and rotatably securing the gauge to the housing above the central portion of the beam, and contact means G on the beam and engageable with the gauge.

The construction further includes stop means H to limit rotation of the pivotal support means to prevent overloading the beam and gauge, and means I to yieldingly compensate for the weight of the beam.

The housing A is shown as a simple, downwardly opening, box-like structure having top, side and end walls 10, 11 and 12. In practice, the housing is preferably formed of aluminum and can be established by casting or suitable fabricating procedures, as desired, or as circumstances require.

In the case illustrated, the top wall 10 is inclined rearwardly and downwardly relative to the side and end walls and in such a manner as to cooperate with the rear end portion of the side walls and the rear end wall to define an upwardly opening receptacle or tray for receiving and holding adapters 13, and the like.

An upwardly projecting, transversely extending rib 14 forming a forward wall or flange for the tray or receptacle can be provided on the top wall, as illustrated.

The top wall 10 is also inclined in the manner set forth above, so that the gauge E, through the mounting means F, is mounted in a pitched or inclined manner and is so disposed that the operator of the construction can more easily and readily read the dial face of the gauge.

Finally, the top wall 10 is provided with a central, vertical opening 15 to accommodate an operating stem 16 depending from the gauge and a pair of fastener receiving openings 17 for the mounting means F, as will hereinafter be described.

The side walls 11 of the housing are provided with a pair of axially aligned bearing receiving openings 18. Bearings are laterally secured by bearing retainer plates 19.

The side walls are shown as further including laterally outwardly projecting apertured mounting pads 21 at their opposite ends, which pads are adapted to cooperatively receive suitable screw fasteners 22 to secure the housing in fixed position on a suitable supporting surface or bench top (not shown).

The forward or front end wall 12 is shown provided with a pair of vertically spaced, axially inwardly projecting bosses 23 having threaded bores extending therethrough and in which suitable stock pins, or screws of the means H are engaged, as will hereinafter be described.

It will be apparent that easy access to the interior of the housing A can be had through the open bottom of the housing.

If desired, or if circumstances require, suitable access openings, and the like, can be provided in one or more of the walls of the housing to provide access to the structure arranged within the housing.

While I have shown the particular housing A described above, it will be apparent and it is to be understood that an open framework or the like could be employed in its stead, without departing from the spirit of the invention. Accordingly, the housing A is, generally, a supporting structure having top, side and end portions.

The deflecting beam B is a simple, elongate piece of barstock. The beam is round in cross-section so as to facilitate easy and accurate machining and establishment of the beam and is established of a high quality steel. In practice, the beam is suitably heat treated to achieve a safe margin of tensile strength. The beam is especially proportioned so that the maximum stress that can be applied falls safely within the proportional limits of the material from which it is established.

The pivotal mounting means C that I provide includes an elongate, cylindrical drive shaft 25 arranged within the front end portion of the housing A in axial alignment with the bearing receiving openings 18 in the housing. The shaft has flat, axially outwardly disposed ends 26 and is provided with axially outwardly projecting trunnions 27 of reduced diameter, which trunnions project through their related bearing openings 18. The trunnions 27 are provided at their outer ends with axially outwardly projecting tool-engaging heads 28. In the drawings, I have shown only one end of the shaft with its related trunnion and tool engaging head. It is to be understood that the other or opposite end of the shaft is identical.

The tool engaging heads 28 are simple, polygonal extensions on the outer free ends of the trunnions 27 and are adapted to be engaged by a wrench, or the like, or are adapted to cooperatively engage with adapters, which adapters are, in turn, adapted to be engaged with or by a torque imparting tool or device to be tested.

The means C further includes an anti-friction bearing 29 related to each end of the shaft, each bearing 29 has an outer race 30 engaged in its adjacent opening 18, with snug fit, and an inner race 31 slidably engaged on its related shaft trunnion 27 and stopped against the adjacent end 26 of the shaft. An annular row of balls (not shown) is arranged between the adjacent races.

The bearings are retained against axial inward movement by the ends 26 of the shaft and are held against axial outward shifting by means of flat, annular keeper or retainer plates 19 fixed to the exterior of the housing by suitable screw fasteners and through which the outer ends of the trunnions freely project.

The shaft 25 is further provided with a transversely extending beam receiving opening 32 intermediate its ends and in or through which the forward end portion of the beam B is press fitted. In practice, a suitable set screw is carried by the shaft to engage and hold the beam against displacement.

From the foregoing, it will be apparent that the beam B is suitably pivotally supported at its forward end by the means C and that torsional forces are applied directly thereto upon the exertion of torsional forces onto and through the unitary shaft, trunnion, and tool engaging head structure.

In the preferred carrying out of the invention and as illustrated in FIG. 2 of the drawings, the forwardly opening counterbore 33 is provided in the shaft, concentric with the opening 32, which bore extends to and terminates at the central axis of the shaft. The provision of the bore 33 leaves the beam unsupported by the shaft, forward of its rotative axis, so that the beam is free to deflect forwardly from the turning axis of the construction and its forward portion is not lifted or elevated by the forward portion of the shaft and in such a manner as to adversely affect the functioning of the construction. With this relationship of parts, the applied torque is transmitted through the shaft directly to the beam as a moment about the rotative axis of the beam.

If the end of the beam is press fitted through the shaft 25 without the counterbore 33, the applied torque is transmitted directly to the beam in the form of a couple about the rotative axis of the beam, reducing the bearing forces between beam and shaft, but requiring a greater degree of adjustment for calibrating the instrument than the preferred counterbored construction.

The support means D at the rear end of the housing can be arranged to occur above or below the rear end of the housing, depending upon which direction of rotation one wishes to impart on and through the beam. In the instant case, I have shown the means D arranged above the rear end of the beam B including a flat, horizontally disposed plate 35 arranged adjacent the bottom surface of the top wall 10 of the housing A, a pair of laterally spaced, depending legs 36 on the plate, a transversely extending axle pin 37 extending between and carried by the legs and a beam engaging roller 38 rotatably carried by the pin, between the legs.

The plate is provided with a pair of elongate fastened receiving slots 39, extending parallel with the longitudinal axis of the construction and through which a pair of clamp screws 40, threadedly engaged in the top wall 10 of the housing extend.

The roller is positioned so as to engage the top or uppermost side of the beam, as clearly illustrated in FIGS. 1 and 4 of the drawings.

It will be apparent that by releasing the screws 40 from tight clamped engagement with the plate 35, the plate and, as a result, the roller 38 can be advantageously shifted longitudinally relative to the rear end portion of the beam for the purpose of adjusting the effective beam length for calibrating the construction.

A suitable mounting flange 10' is shown provided on the rear wall of the housing, below the beam and on which the means D can be mounted if it is desired to rotate and flex the beam in the opposite direction.

The assembly E that I provide includes standard, long-range dial indicator gauge O, such as is produced by "Federal Products Corporation" and serves to measure the deflection of the beam at the center thereof, where deflection is near maximum and converts the deflection into torque units.

The gauge O is shown as including a cylindrical case 45 with a glass window 46 at one end thereof and through which a suitable calibrated dial face 47 and pointer or needle 48 can be advantageously viewed and read.

In addition to the foregoing, the gauge has a reset means 49 and a zero adjusting bezel 50 in accordance with common gauge or dial indicator constructions.

The gauge O is further provided with rearwardly projecting notched boss 51 to slidably receive a vertical slotted tongue 52 of a gauge assembly bracket 53. A threaded fastener 54 is engaged through the slotted tongue and boss to hold the gauge in fixed vertical position on the tongue.

The gauge assembly bracket 53 also includes a horizontal disc-shaped pad 55 having a central opening at the lower end of the tongue through which a cylindrical neck 56 depending from the bottom side of the case projects. The gauge operating stem 16 projects through the neck 56 and depends therefrom in accordance with common practice.

The gauge neck 56 projects into the opening 15 in the top wall 10 of the housing to maintain the operating stem axis in a fixed location while permitting rotation of the gauge assembly to any desired reading position when mounted on the housing by means as described below.

The disc-shaped pad 55 of the gauge assembly bracket 53 is adapted to establish flat bearing engagement on the top wall of the housing and is provided with a pair of radially outwardly projecting tabs or ears 57 for clamping engagement on the housing, as will be described.

The mounting means F for the gauge O includes an annular clamp ring 58 having an outer, lower flange 58ª adapted to engage the top wall 10 of the housing and an inner, upper flange 58ᵇ adapted to occur in spaced relationship above the top wall 10.

The clamp ring is arranged on the top wall 10 of the housing A concentric with the central opening 15 therein and is provided with a pair of openings in its outer, lower flange, through which suitable thumb screw 59, engaged in the openings 17 in the top wall, are engaged.

The upper flange 58ᵇ is provided with a pair of diametrically opposed notches 57ª. In the drawings (see FIG. 1), only notch 57ª is shown.

The tabs 57 on the pad 55 project beneath the upper flange 58ª of the ring and are clamped between said flange and the top wall 10 when the aforementioned thumb screws are tightened. The tabs or ears 57 are shiftable through the notches 57ª in the clamp ring, when the dial is rotated to a predetermined position, for easy and convenient engagement and disengagement of the gauge assembly with the construction.

The stem 16 of the gauge O depends from the neck 56 into the interior of the housing and terminates above the central portion of the beam.

The contact means G is adapted to establish contact between the beam and the lower end of the stem 16 and is shown as including a block 60 with a central bore 61 slidably receiving the beam.

The lower end of the block 60 is split, longitudinally of the construction, as at 62, and carries a suitable clamp screw 63 to facilitate clamping the block in fixed position on the beam.

The block 60 carries a flat contact plate 64 at its upper or top side, which plate presents a flat, uniform surface on which the lower end of the stem rests.

In practice, the top side or surface of the block can be of suitable size and can be suitably machined to engage the lower end of the stem, in which case the plate mentioned above, can be eliminated.

It will be apparent that the block can be shifted axially of the beam and set in any desired position thereon, by first releasing the screw 63, shifting the block to the desired position and then tightening said screw. The point of maximum deflection occurs between the pivotal axis of the drive shaft supported end and the midpoint of the beam. Said point occurs a distance of approximately .076 times the effective length of the beam from the midpoint thereof.

Shifting the block 60 toward the point of maximum deflection increases the torque readout on the gauge and shifting the block away from the point of maximum deflection reduces the torque readout on the gauge, thus, providing a "fine" calibration means to supplement the more extensive adjustment in effective beam length provided by the adjustable beam support D.

The stop means H that I provide includes a pair of radially extending, normally substantially rearwardly disposed stop surfaces on the shaft 25 above and below the central axis of the shaft. That is, the stop means includes upper and lower rearwardly disposed stop surfaces 70 and 71 on the shaft 25.

In practice, the surfaces 70 and 71 can, as illustrated, be established in the body of the shaft by a suitable milling or machining operation.

The means H further includes a pair of elongate stop screws 72 and 73 threadedly engaged through the bosses 23 on the front end wall of the housing H and projecting rearwardly into the housing at substantially right angles to the planes of the said surfaces 71 and 70 and terminating in predetermined proximity to the said surfaces 70 and 71.

With this relationship of parts, it will be apparent that the stop screws 72 and 73 can be adjusted longitudinally of the construction so as to allow for predetermined rotation of the shaft in either direction and that upon reaching the limit of the motion desired, the surface 70 and 71, whichever the case may be, engages its related stop screw and further rotation is prevented.

It will be apparent that the stop screws are subjected to axial or compressive forces only, and, as a result, are not subject to being bent or displaced by the exertion of abnormally great forces.

While I have shown the stop surfaces 70 and 71 established in the shaft by a milling operation, it is to be understood that such surfaces can be advantageously established in many other ways without departing from the spirit of this invention. For example, the subject stop surfaces can be established by the end portions of a suitable dowel pin engaged through an opening in the shaft.

With the means H that I provide, the extent of deflection of the beam B can be advantageously controlled or limited to prevent overloading the beam and to prevent reverse deflection of the beam.

In practice, if desired, the means I illustrated in the drawings can be provided to compensate for the weight of the beam and maintain the rear end of beam against its support D, when the construction is not in use.

The means I may take forms and in the case illustrated includes a hook 80 at the rear end of the beam B, a hook 81 carried by the housing A in spaced relationship above the hook 80 and a tension spring 82 arranged between and engaged with the hooks.

In practice, excessive downward movement of the rear end of the beam, into engagement with the surface on which the construction is mounted and which might allow for reverse deflection of the beam, is prevented by the lower stop screw 73 and its related surface 71 of the means H, described above.

From the foregoing, it will be apparent that I have provided an extremely simple, yet highly effective and dependable torque testing mechanism.

It will be further apparent that, in practice, due to the limited vertical and lateral space that is required by the subject mechanism, a plurality of different size torque testing mechanisms, as here provided, each adapted to handle a predetermined range of torsional forces, can be advantageously assembled and related together in a single housing.

In FIGS. 5 and 6 of the drawings, I have shown a unit wherein three torque testing mechanisms M, M' and M", as provided by the present invention, are arranged within a single housing A'.

Due to the limited lateral space that is required for the beams B', B" and B³, and their related pivot means, gauges and contact means, the lateral positioning of the beams with their related shafts of their related pivotal mounting means, can be varied so that the several beams are in lateral spaced vertical planes within the housing, as illustrated in FIG. 6 of the drawings. It is to be noted that the above lateral spacing and positioning of the beams can be accomplished without requiring that the housing be made much wider than is required in a single unit, such as is illustrated in FIG. 1 of the drawings.

The several units in the multiple unit construction are in vertical spaced relationship, but such vertical spacing need only be sufficient to accommodate the bearings of the several pivotal support means, one above the other, and as a result is minimal.

Since different sizes of our torque measuring or testing mechanisms, designed to measure different ranges of forces, employ deflection beams of different cross section and length, and since our measurements of deflection are taken from the centers of the beams; when the several mechanisms are arranged in a common housing, the position of the several gauges necessarily occur in spaced relationship from each other, longitudinally of the housing with the result that the lateral extent of the construction need not appreciably be increased for the purpose of accommodating the several gauges, as would be the case if the gauges had to be arranged in side by side relationship.

Having described preferred forms and applications of my invention, I do not wish to be limited to the specific details herein set forth, but wish to reserve to myself any modifications and variations that may appear to those skilled in the art and which fall within the scope of the following claims.

Having described my invention, I claim:

1. A torque tester of the character referred to including, an elongate support structure having front and rear ends, pivotal support means extending transverse the front end portion of the support structure and rotatably carried thereby, an elongate deflection beam arranged within the support structure to extend longitudinally thereof, and having one end portion fixed to the pivot support means, anti-friction support means carried by the support structure to occur above and support the other end portion of the beam, a dial indicator carried by the support structure above the beam at a point substantially intermediate the pivotal support means and the anti-friction bearing support and having a depending operating stem engaging the top side of the beam to measure the upward deflection of the central portion of the beam when rotated upwardly by said pivotal support means, and a laterally outwardly projecting torque tool engaging head on the pivotal support means and accessible at the exterior of the construction.

2. A torque tester of the character referred to including, an elongate support structure having front and read ends, pivotal support means extending transverse the front end portion of the support structure and rotatably carried thereby, an elongate deflection beam arranged within the support structure to extend longitudinally thereof, and having one end portion fixed to the pivot support means, a bearing support carried by the support structure to occur above the other end portion of the beam to support and limit upward movement of said other end portion of the beam, a dial indicator carried by the support structure above the beam at a point substantially intermediate the pivotal support means and the bearing support and having a depending operating stem engaging the top side of the beam and adapted to measure the upward deflection of the central portion of the beam when said other end of the beam is urged upwardly into pressure engagement with the bearing support upon rotation of the pivotal support means, a laterally outwardly projecting torque tool engaging head on the pivotal support means and accessible at the exterior of the construction, and stop means to limit pivotal movement of the pivotal support means and resulting swinging of the deflection beam including, upper and lower forwardly disposed stop faces on the pivotal support means at opposite sides of the pivotal axis thereof, and upper and lower forwardly projecting and longitudinally shiftable stop screws carried by the support structure forward of the pivotal support means and engageable with said forwardly disposed surfaces.

3. A torque tester of the character referred to including, an elongate housing having substantially flat top, side and front and rear end walls, torque tool engaging pivotal support means rotatably carried by the housing and extending between and through the side walls at the front end portion of the housing, an elongate cylindrical deflection beam with one end portion fixed to the pivotal support means and projecting forwardly into the housing with its other end adjacent the rear end of the housing, an anti-friction bearing support carried by the top wall of the housing at the rear end portion thereof and depending into the housing to engage and support the top of the rear end portion of the beam, a dial indicator with an elongate operating stem projecting therefrom, mounting means on the top wall of the housing, above the central portion of the beam and releasably mounting the dial indicator above said top wall and with its operating stem depending into the housing and opposing the top of the beam at a point intermediate the pivotal support means and the stop pivot means, indicator contact means on and projecting upwardly from the central portion of the beam and having an upwardly disposed operating stem engaging surface, and stop means limiting pivotal movement of the pivotal support means and the deflection beam and including circumferentially disposed stop surfaces on the pivotal support means and axially shiftable stop screws carried by the housing to oppose and engage with said stop surfaces.

4. A structure as set forth in claim 3, wherein said pivotal support means includes an elongate shaft extending transverse the interior of the housing and having a central transverse, longitudinally extending opening receiving and holding the front end portion of the beam, trunnions at the ends of the shaft and projecting laterally outwardly through axially aligned, bearing receiving openings in the side walls, laterally outwardly projecting polygonal tool engaging heads at the outer ends of the trunnions and anti-friction bearings at each end of the shaft and having inner races engaged on the trunnions and outer races engaged in said openings in the side walls.

5. A structure as set forth in claim 3, wherein said pivotal support means includes, a pair of axially aligned openings in the side walls of the housing, a pair of anti-friction bearings engaged in said openings, an elongate shaft extending transverse the interior of the housing with its ends rotatably supported by said bearings, and having a central, transverse opening receiving and holding the forward end portion of the deflection beam and having laterally outwardly projecting torque tool engaging heads at its ends and accessible at the exterior of the housing, anti-friction bearing support means including a plate engaged with the top wall of the housing and having a pair of laterally spaced depending legs, a deflection beam engaging roller arranged between and rotatably carried by the legs and fastener means releasably holding the plate in tight clamped engagement on said top wall.

6. A torque tester of the character referred to including an elongate support structure having front and rear ends, a torque tool engaging shaft extending transverse the front end portion of the support structure and rotatably supported thereby, an anti-friction bearing at the rear end portion of the support structure, an elongate deflection beam arranged within the support structure to extend longitudinally thereof with its central longitudinal axis intersecting the axis of the shaft, its forward end fixed to and supported by the shaft and its rear end in bearing supported engagement with said anti-friction bearing, a dial indicator gauge carried by the support structure and operatively related to the beam near the point of maximum deflection and adapted to measure the beam deflection in terms of torque units upon the application of torque onto and through the shaft, and a dial indicator contact block carried by the beam at the central portion thereof and shiftable longitudinally thereof to select the point of deflection of the beam to be measured and thereby calibrate the construction.

7. A torque tester of the character referred to including an elongate support structure having front and rear ends, a torque tool engaging shaft extending transverse the front end portion of the support structure and rotatably supported thereby, an anti-friction bearing at the rear end portion of the support structure, an elongate deflection beam arranged within the support structure to extend longitudinally thereof with its central longitudinal axis intersecting the axis of the shaft, its forward end fixed to and supported by the shaft and its rear end in bearing supported engagement with said anti-friction bearing, a dial indicator gauge carried by the support structure and operatively related to the beam near the point of maximum deflection and adapted to measure the beam deflection in terms of torque units upon the application of torque onto and through the shaft, said anti-friction bearing being shiftable longitudinally of the support structure and the beam to alter the effective length of the beam to calibrate the construction, and a structure which further includes a dial indicator contact block by the beam at the central portion thereof and shiftable longitudinally thereof to select the point of deflection of the beam to be measured and thereby calibrate the construction.

8. A torque tester of the character referred to including an elongate support structure having front and rear ends, a torque tool engaging shaft extending transverse the front end portion of the support structure and rotatably supported thereby, an anti-friction bearing at the rear end portion of the support structure, an elongate deflection beam arranged within the support structure to extend longitudinally thereof with its central longitudinal axis intersecting the axis of the shaft, its forward end fixed to and supported by the shaft and its rear end in bearing supported engagement with said anti-friction bearing, a dial indicator gauge carried by the support structure and operatively related to the beam near the point of maximum deflection and adapted to measure the beam deflection in terms of torque units upon the application of torque onto and through the shaft, and adjustable stop means between the support structure and the shaft to limit rotation of the shaft in both directions, whereby the beam cannot be overloaded and deflection of the beam is limited to one direction, said stop means including a pair of circumferentially spaced, substantially tangentially disposed stop shoulders on the shaft and a stop screw related to each shoulder with its axis substantially normal to the said surface and carried by the support structure for axial shifting relative thereto and to its related shoulder.

9. A torque tester of the character referred to including an elongate support structure having front and rear ends, a torque tool engaging shaft extending transverse the front end portion of the support structure and rotatably supported thereby, an anti-friction bearing at the rear end portion of the support structure, an elongate deflection beam arranged within the support structure to extend longitudinally thereof with its central longitudinal axis intersecting the axis of the shaft, its forward end fixed to and supported by the shaft and its rear end in bearing supported engagement with said anti-friction bearing, a dial indicator gauge carried by the support structure and operatively related to the beam near the point of maximum deflection and adapted to measure the beam deflection in terms of torque units upon the application of torque onto and through the shaft, and adjustable stop means between the support structure and the shaft to limit rotation of the shaft in both directions, whereby the beam cannot be overloaded and deflection of the beam is limited to one direction, and a dial indicator contact block carried by the beam at the central portion thereof and shiftable longitudinally thereof to select the point of deflection of the beam to be measured and thereby calibrate the construction.

10. A torque tester of the character referred to including a elongate support structure having front and rear ends, a torque tool engaging shaft extending transverse the front end portion of the support structure and rotatably supported thereby, an anti-friction bearing at the rear end portion of the support structure, an elongate deflection beam arranged within the support structure to extend longitudinally thereof with its central longitudinal axis intersecting the axis of the shaft, its forward end fixed to and supported by the shaft and its rear end in bearing supported engagement with said anti-friction bearing, a dial indicator gauge carried by the support structure and operatively related to the beam near the point of maximum deflection and adapted to measure the beam deflection in terms of torque units upon the application of torque onto and through the shaft, and adjustable stop means between the support structure and the shaft to limit rotation of the shaft in both directions, whereby the beam cannot be overloaded and deflection of the beam is limited to one direction, and a dial indicator contact block carried by the beam at the central portion thereof and shiftable longitudinally thereof to select the point of deflection of the beam to be measured and thereby calibrate the construction, said anti-friction bearing is shiftable longitudinally of the support structure and the beam to alter the effective length of the beam to calibrate the construction.

11. A torque tester of the character referred to including an elongate support structure having front and rear ends, a torque tool engaging shaft extending transverse the front end portion of the support structure and rotatably supported thereby, an anti-friction bearing at the rear end portion of the support structure, an elongate deflection beam arranged within the support structure to extend longitudinally thereof with its central longitudinal axis intersecting the axis of the shaft, its forward end fixed to and supported by the shaft, and its rear end in bearing supported engagement with said anti-friction bearing, a dial indicator gauge carried by the support structure and operatively related to the beam near the point of maximum deflection and adapted to measure the beam deflection in terms of torque units upon the application of torque onto and through the shaft, said shaft having a transverse forwardly and rearwardly disposed beam receiving opening in which the front end portion of the beam is engaged and an enlarged counterbore entering the rearwardly disposed side of the beam, concentric with the opening and terminating at the central axis of the shaft and through which the beam freely projects, whereby the deflection of the beam is unrestricted from its forward pivotal axis to the anti-friction bearing at its rear end portion.

12. A torque tester of the character referred to including an elongate support structure having front and rear ends, a torque tool engaging shaft extending transverse the front end portion of the support structure and rotatably supported thereby, an anti-friction bearing at the rear end portion of the support structure, an elongate deflection beam arranged within the support structure to extend longitudinally thereof with its central longitudinal axis intersecting the axis of the shaft, its forward end fixed to and supported by the shaft, and its rear end in bearing supported engagement with said anti-friction bearing, a dial indicator gauge carried by the support structure and operatively related to the beam near the point of maximum deflection and adapted to measure the beam deflection in terms of torque units upon the application of torque onto and through the shaft, said shaft having a transverse forwardly and rearwardly disposed beam receiving opening in which the front end portion of the beam is engaged and an enlarged counterbore entering the rearwardly disposed side of the beam, concentric with the opening and terminating at the central axis of the shaft and through which the beam freely projects, whereby the deflection of the beam is unrestricted from its forward pivotal axis to the anti-friction bearing at its rear end portion, said anti-friction bearing is shiftable longitudinally of the support structure and the beam to calibrate the construction.

13. A structure as set forth in claim 6 wherein, said shaft has a transverse forwardly and rearwardly disposed beam receiving opening in which the front end portion of the beam is engaged and an enlarged counterbore entering the rearwardly disposed side of the beam, concentric with the opening and terminating at the central axis of the shaft and through which the beam freely projects, whereby the deflection of the beam is unrestricted from its forward pivotal axis to the anti-friction bearing at its rear end portion.

14. A structure as set forth in claim 6 wherein said shaft has a transverse forwardly and rearwardly disposed beam receiving opening in which the front end portion of the beam is engaged and a enlarged counterbore entering the rearwardly disposed side of the beam, concentric with the opening and terminating at the central axis of the shaft and through which the beam freely projects, whereby the deflection of the beam is unrestricted from its forward pivotal axis to the anti-friction bearing at its rear end portion, said anti-friction bearing is shiftable longitudinally of the support structure and the beam to alter the effective length of the beam to calibrate the construction.

References Cited

UNITED STATES PATENTS

| 2,196,223 | 4/1940 | Montgomery | 73—139 |
| 2,283,888 | 5/1942 | Zimmerman | 73—139 |

FOREIGN PATENTS

| 1,045,309 | 6/1953 | France. |

LOUIS R. PRINCE, *Primary Examiner.*

S. C. SWISHER, *Assistant Examiner.*